US012596128B2

(12) United States Patent
Tsuji et al.

(10) Patent No.: US 12,596,128 B2
(45) Date of Patent: Apr. 7, 2026

(54) AUTOMATIC ANALYZER

(71) Applicant: Hitachi High-Tech Corporation, Tokyo (JP)

(72) Inventors: Hitomi Tsuji, Tokyo (JP); Yuya Matsuoka, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 722 days.

(21) Appl. No.: 17/911,212

(22) PCT Filed: Jan. 26, 2021

(86) PCT No.: PCT/JP2021/002632
§ 371 (c)(1),
(2) Date: Sep. 13, 2022

(87) PCT Pub. No.: WO2021/186902
PCT Pub. Date: Sep. 23, 2021

(65) Prior Publication Data
US 2023/0107314 A1      Apr. 6, 2023

(30) Foreign Application Priority Data

Mar. 17, 2020      (JP) ................................. 2020-046242

(51) Int. Cl.
*G01N 35/00*           (2006.01)
*B01L 7/00*            (2006.01)
(Continued)

(52) U.S. Cl.
CPC .......... *G01N 35/00584* (2013.01); *B01L 7/00* (2013.01); *G01N 35/025* (2013.01);
(Continued)

(58) Field of Classification Search
None
See application file for complete search history.

(56) References Cited

U.S. PATENT DOCUMENTS

| | | | |
|---|---|---|---|
| 5,475,610 | A | 12/1995 | Atwood et al. |
| 6,296,809 | B1 | 10/2001 | Richards et al. |

(Continued)

FOREIGN PATENT DOCUMENTS

| | | | |
|---|---|---|---|
| CN | 201065405 Y | * | 5/2008 |
| CN | 103703118 A | | 4/2014 |

(Continued)

OTHER PUBLICATIONS

Search Report mailed Apr. 13, 2021 in International Application No. PCT/JP2021/002632.

(Continued)

*Primary Examiner* — P. Kathryn Wright
(74) *Attorney, Agent, or Firm* — Miles & Stockbridge, P.C.

(57) ABSTRACT

Provided is an automatic analyzer capable of appropriately controlling most of the temperature of an incubator even when local temperature fluctuation occurs.
An automatic analyzer for analyzing a specimen includes an incubator for holding a plurality of vessels that store a mixed liquid of the specimen and a reagent, a heat source for heating or cooling the incubator, a plurality of temperature sensors provided at different positions of the incubator and measuring the temperature, and a control unit for controlling an output of the heat source based on a difference between a target temperature and the highest temperature or the lowest temperature among the measured temperatures of the temperature sensors.

7 Claims, 8 Drawing Sheets

(51) Int. Cl.
G01N 35/02 (2006.01)
G01N 35/04 (2006.01)

(52) U.S. Cl.
CPC ....... *B01L 2200/16* (2013.01); *B01L 2300/18* (2013.01); *G01N 2035/00356* (2013.01); *G01N 2035/0444* (2013.01)

(56) References Cited

U.S. PATENT DOCUMENTS

| | | |
|---|---|---|
| 2006/0204997 A1 | 9/2006 | Macioszek et al. |
| 2010/0323923 A1 | 12/2010 | Corbett |
| 2014/0170734 A1 | 6/2014 | Shoji et al. |
| 2019/0128810 A1 | 5/2019 | Opalsky et al. |
| 2019/0194593 A1 | 6/2019 | Ozaki et al. |
| 2020/0011857 A1 | 1/2020 | Ismail et al. |
| 2021/0024871 A1 | 1/2021 | Stöhrer et al. |
| 2021/0382078 A1* | 12/2021 | Funakoshi ............... B01L 7/00 |

FOREIGN PATENT DOCUMENTS

| | | |
|---|---|---|
| CN | 105628687 A | 6/2016 |
| CN | 110383035 A | 10/2019 |
| EP | 1073892 B1 | 11/2010 |
| ES | 2293111 T3 | 3/2008 |
| JP | 2008-196000 A | 8/2008 |
| JP | 2012-216423 A | 11/2012 |
| JP | 2016-073129 A | 5/2016 |
| JP | 2017-026522 A | 2/2017 |
| JP | 2019-115266 A | 7/2019 |
| JP | 2019-146591 A | 9/2019 |
| WO | 2018169651 A1 | 9/2018 |
| WO | 2019175432 A1 | 9/2019 |
| WO | WO-2020137081 A1 * | 7/2020 ....... G01N 35/00663 |

OTHER PUBLICATIONS

Written Opinion mailed Apr. 13, 2021 in International Application No. PCT/JP2021/002632.

International Preliminary Report on Patentability mailed Nov. 5, 2021 in International Application No. PCT/JP2021/002632.

Search Report mailed Mar. 14, 2024 in European Application No. 21770561.5.

Office Action mailed Jun. 18, 2025 in Chinese Application No. 202180019357.2.

Office Action mailed Nov. 17, 2025 in Indian Application No. 202217052230.

\* cited by examiner

[FIG. 1]
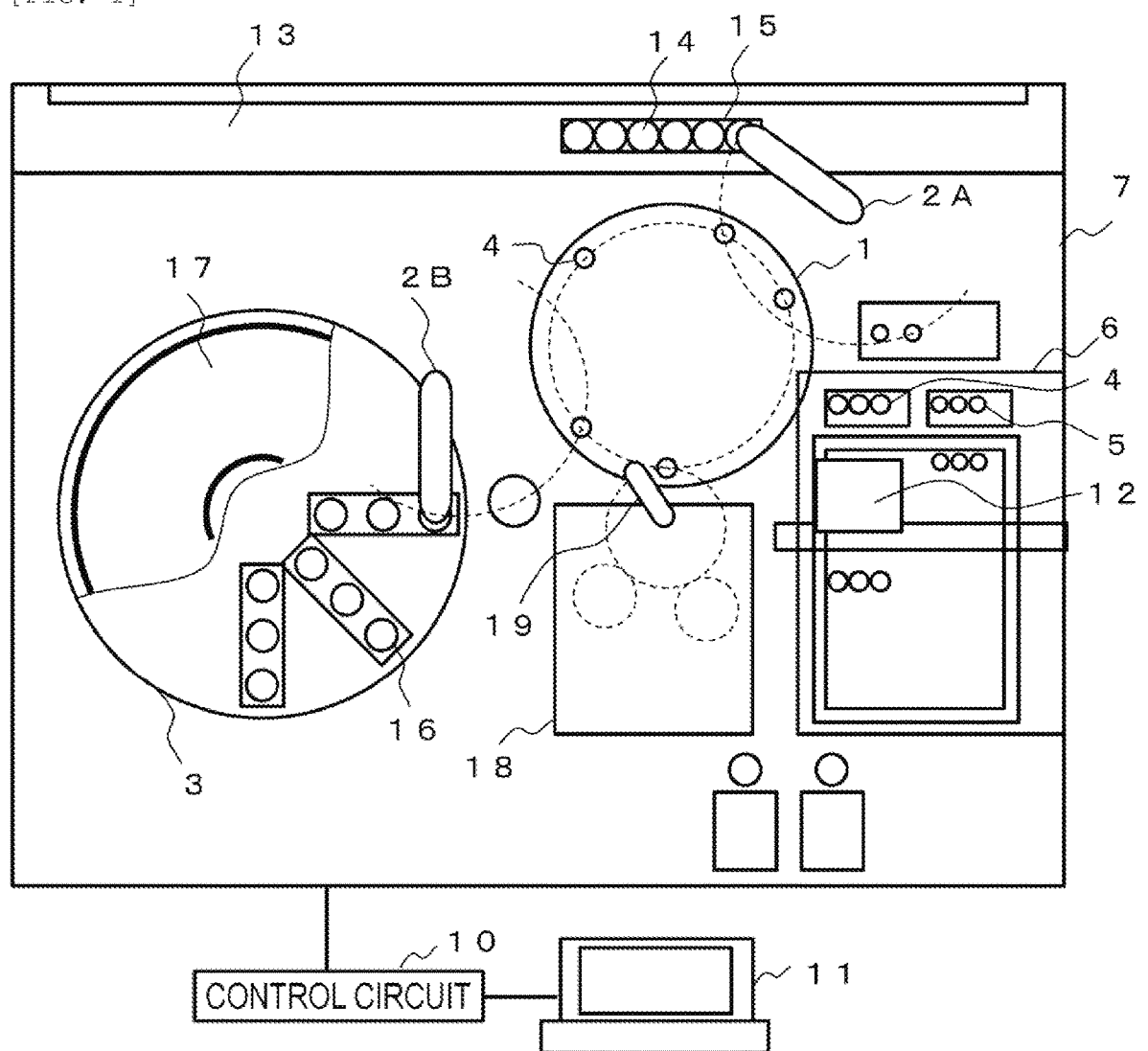

[FIG. 2]
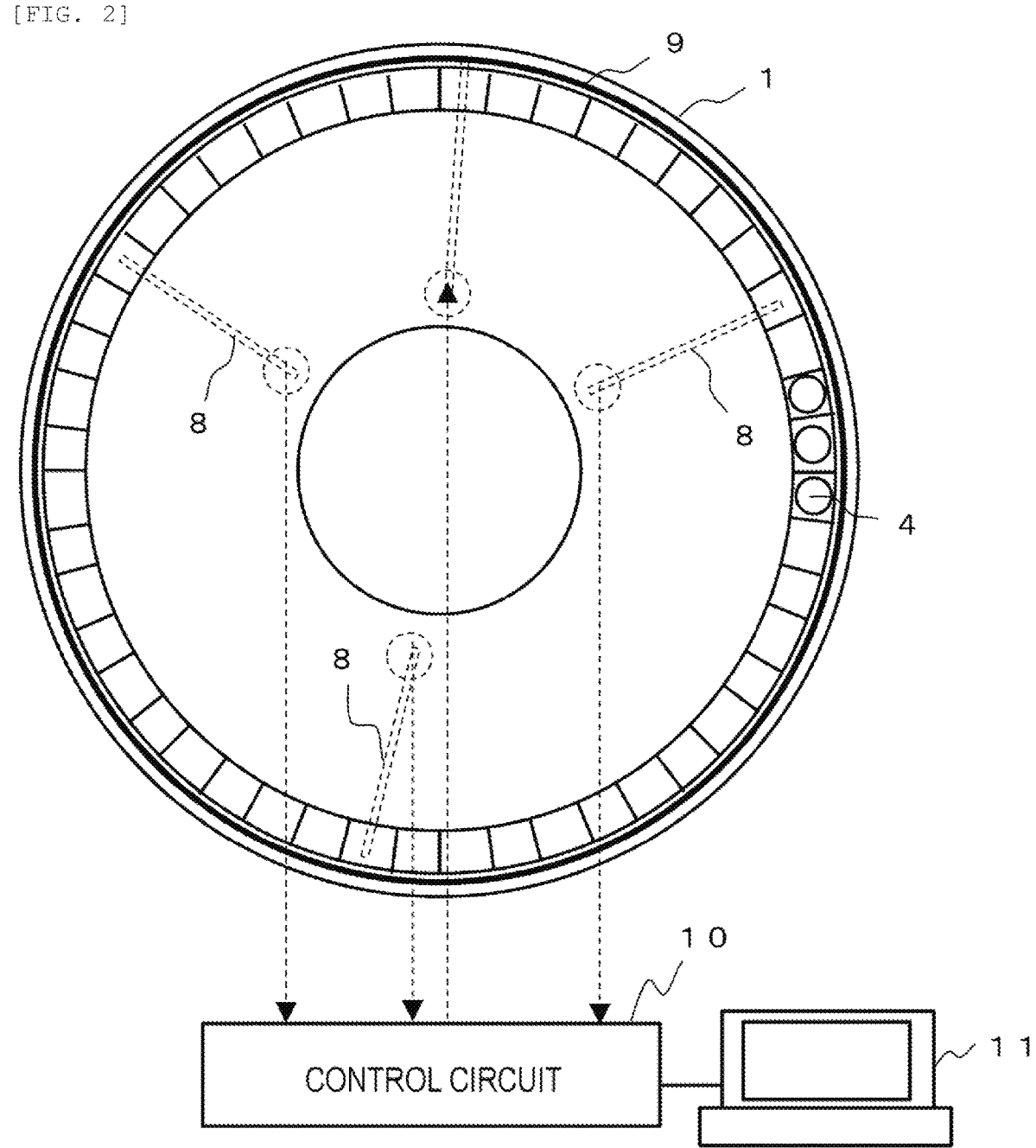

[FIG. 3]
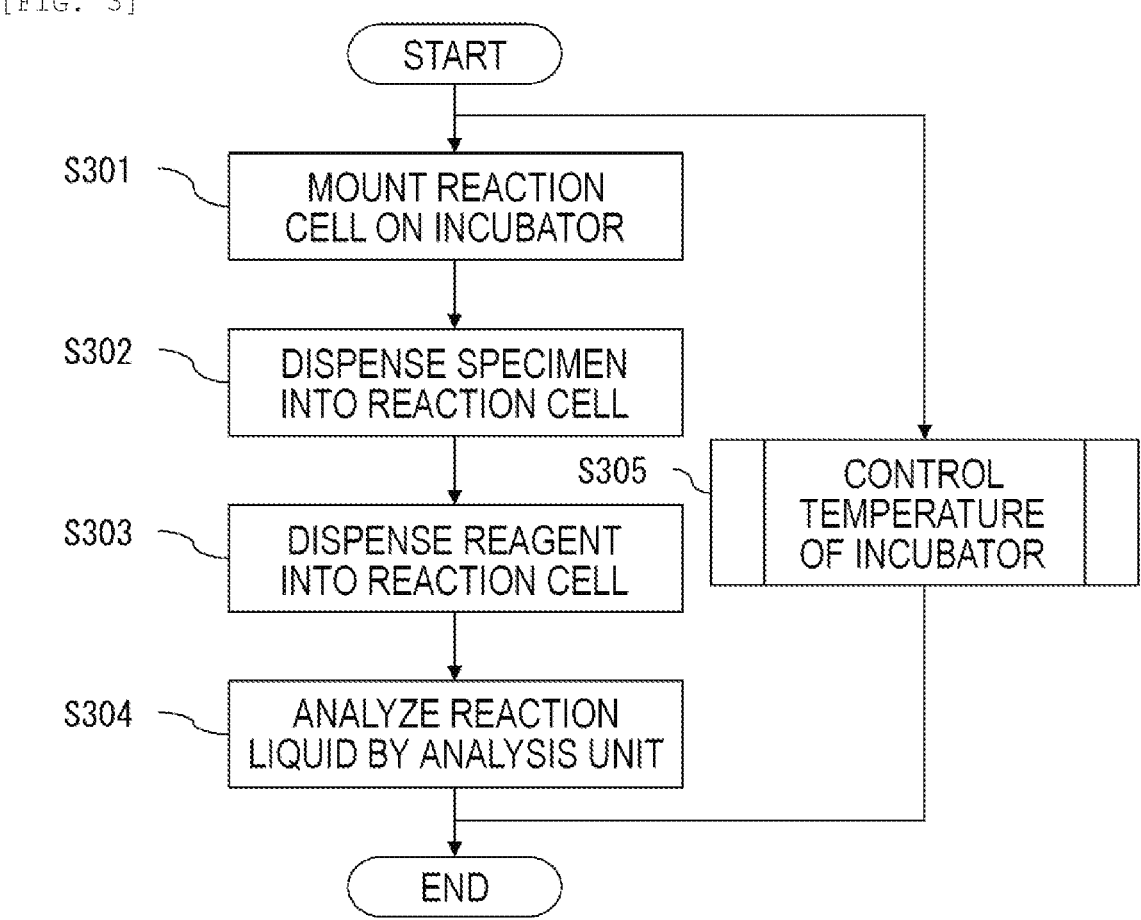

[FIG. 4]
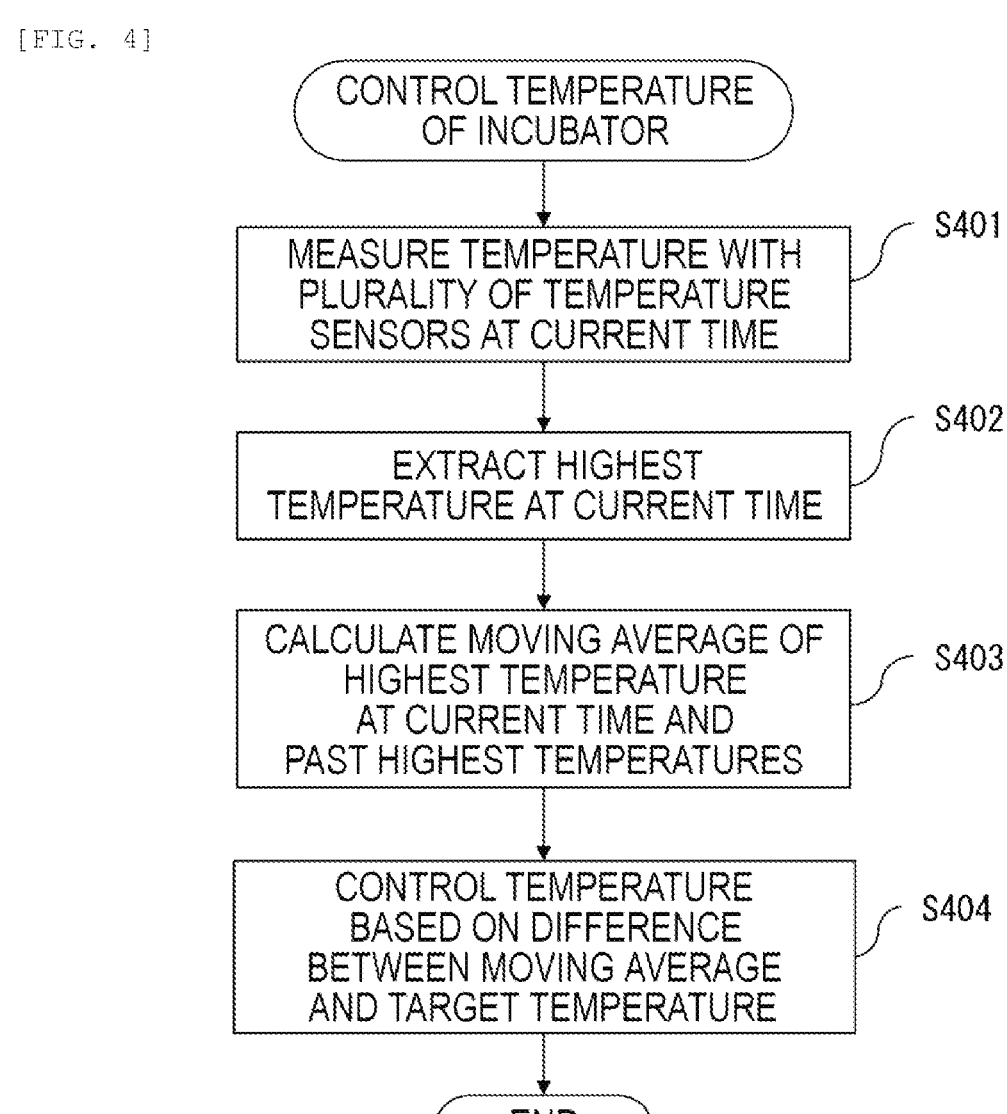

[FIG. 5]
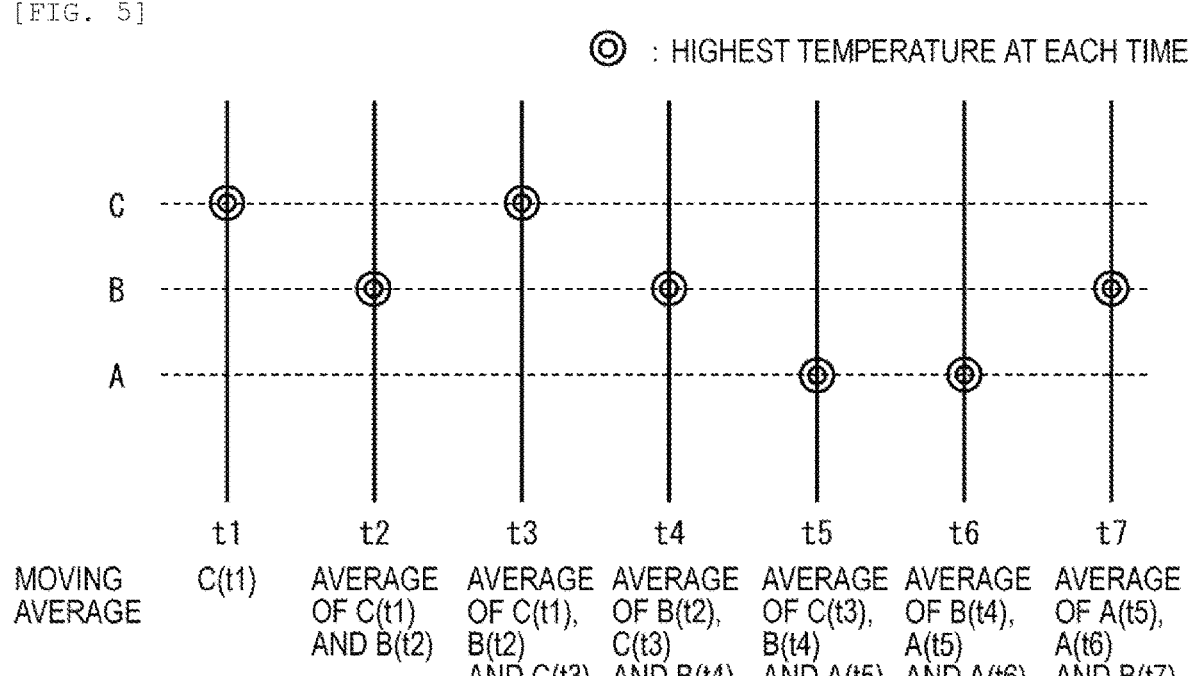

[FIG. 6]
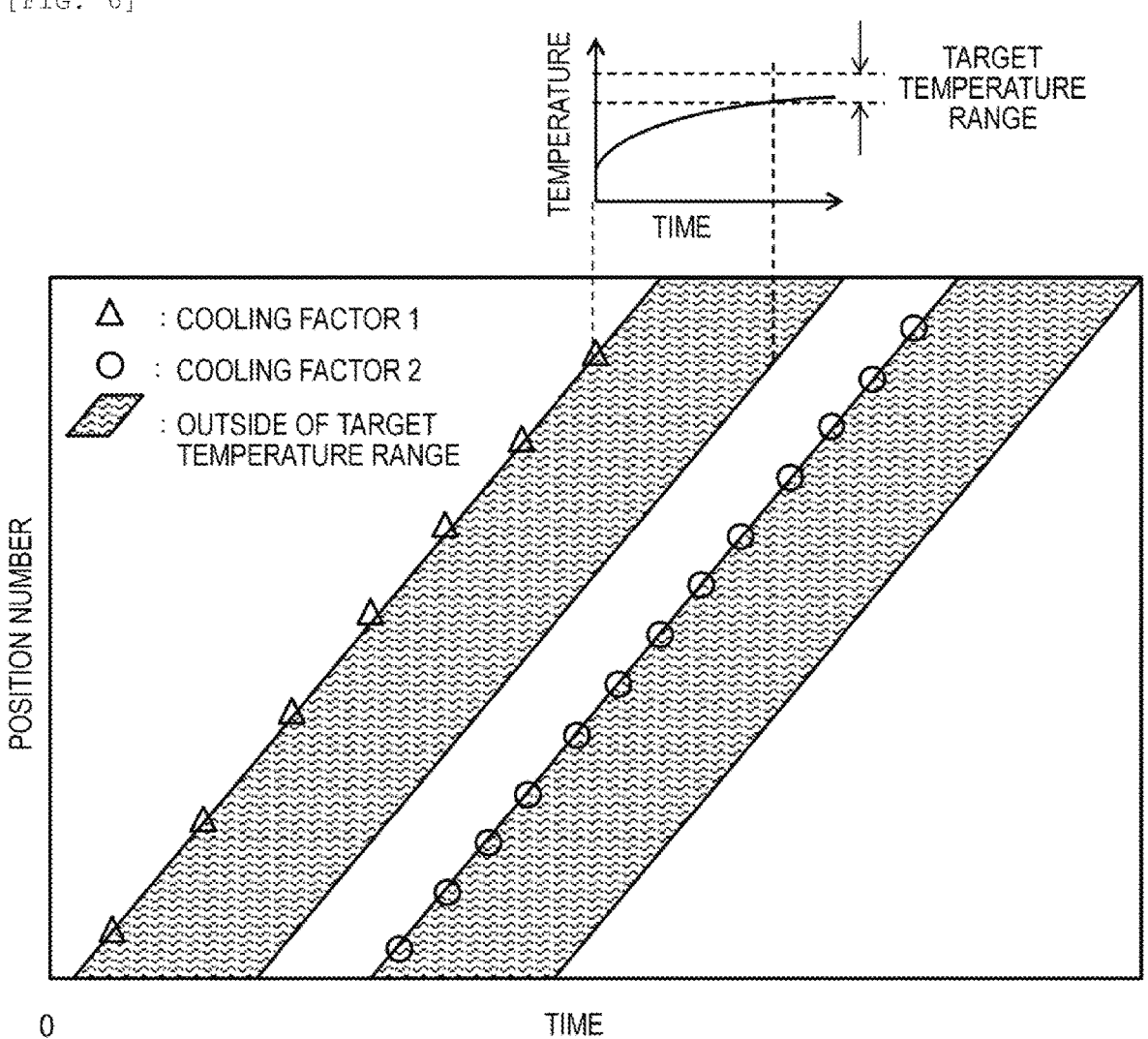

[FIG. 7]
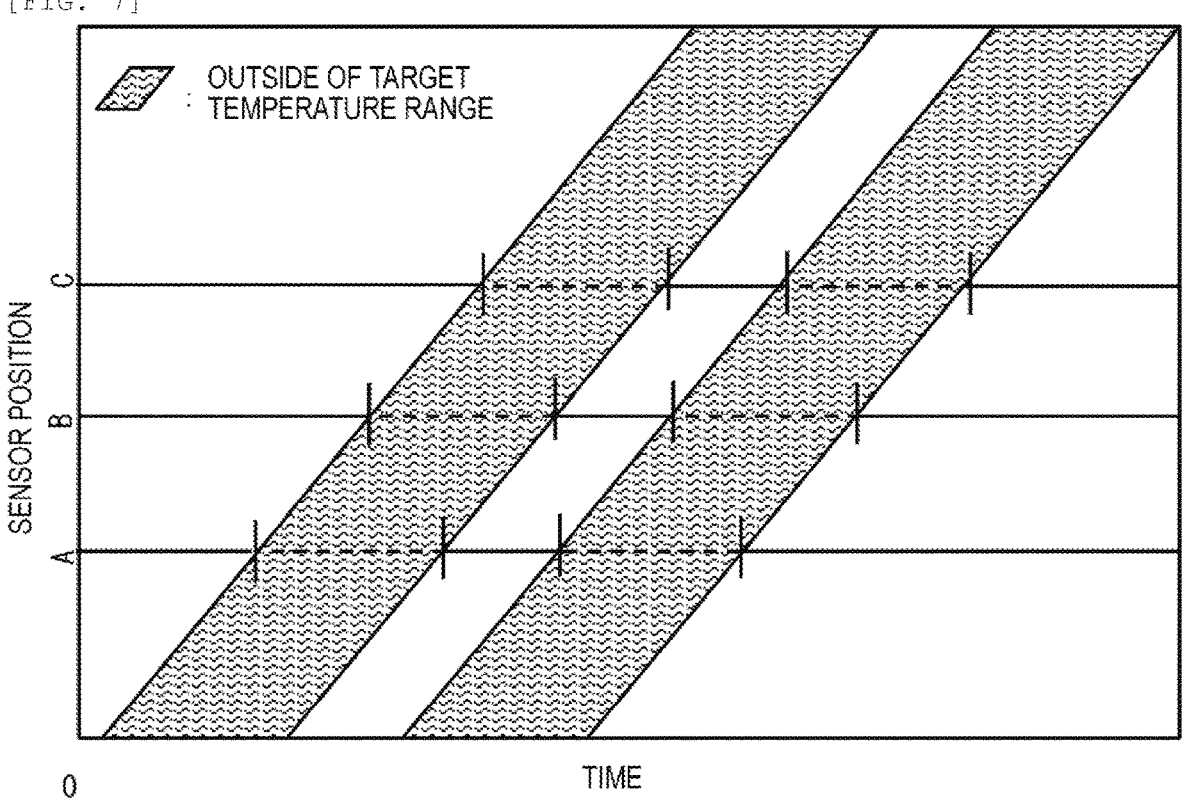

[FIG. 8]
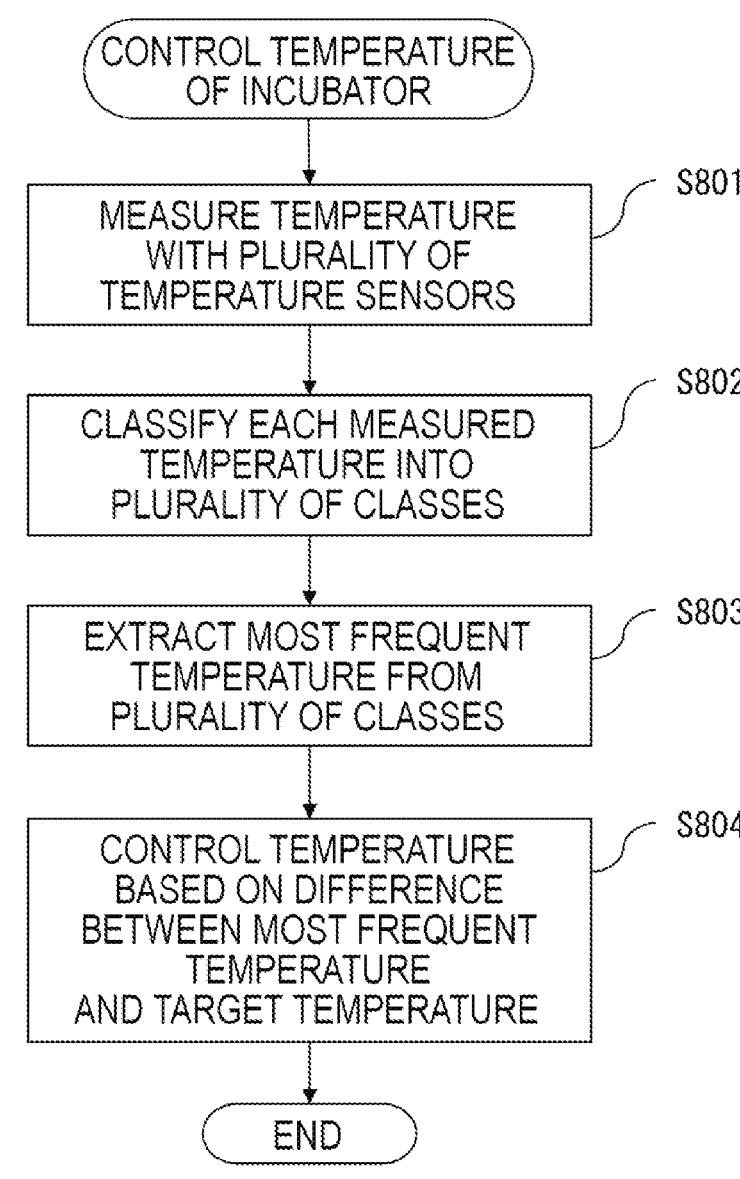

AUTOMATIC ANALYZER

TECHNICAL FIELD

The present invention relates to an automatic analyzer.

BACKGROUND ART

An automatic analyzer is a device that analyzes specific components contained in a specimen such as blood or urine submitted from a patient, and the automatic analyzer is used in hospitals and testing facilities. Prior to the analysis of a specific component in a specimen, a mixed solution having the specimen and a reagent mixed has to be subjected to reaction in a target temperature range for a predetermined time period. Since the mixed solution is stored in a vessel held by an incubator, fluctuations in the temperature of the incubator to the target temperature range cause the reaction of the mixed solution to be unstable, and degrades analysis accuracy.

PTL 1 discloses an automatic analyzer that is capable of highly accurately controlling the temperature of an incubator with no complicated program control. That is, the automatic analyzer of PTL 1, which includes a first temperature sensor and a second temperature sensor provided at different positions in an incubator, controls the output quantity of heat of a heat source based on a differential value between a first temperature and a second temperature that are outputs of the first and second temperature sensors and a differential value between the first temperature and a target temperature.

CITATION LIST

Patent Literature

PTL 1: Japanese Unexamined Patent Application Publication No. 2017-26522

SUMMARY OF INVENTION

Technical Problem

However, in PTL 1, improper temperature control is sometimes conducted highly sensitively in response to local temperature fluctuations in the incubator. For example, when a reagent at a low temperature is dispensed near the temperature sensor, the heat source excessively heats the incubator based on the differential value between the target temperature and the measured temperature, and this sometimes leads to an excess temperature rise in most of the incubator except its part away from the temperature sensor.

Therefore, it is an object of the present invention to provide an automatic analyzer that is capable of appropriately controlling the temperature of most of an incubator even in the case in which local temperature fluctuations occur.

Solution to Problem

In order to achieve the object, the present invention is an automatic analyzer for analyzing a specimen, including: an incubator for holding a plurality of vessels that store a mixed liquid of the specimen and a reagent; a heat source for heating or cooling the incubator; a plurality of temperature sensors for measuring the temperature at different positions of the incubator; and a control unit for controlling an output of the heat source based on a difference between a target temperature and the highest temperature or the lowest temperature among the measured temperatures of the temperature sensors.

Advantageous Effects of Invention

According to the present invention, it is possible to provide an automatic analyzer that is capable of appropriately controlling the temperature of most of an incubator even in the case in which local temperature fluctuations occur.

BRIEF DESCRIPTION OF DRAWINGS

FIG. 1 is a schematic diagram showing a configuration example of an automatic analyzer.

FIG. 2 is a schematic diagram showing a configuration example of an incubator.

FIG. 3 is a diagram showing an example of an operation flow of the incubator.

FIG. 4 is a diagram showing an example of a flow of a temperature control process of the incubator according to Example 1.

FIG. 5 is a diagram for additionally illustrating a moving average.

FIG. 6 is a diagram showing temperature changes over time for each position number of the incubator.

FIG. 7 is a diagram for additionally illustrating the number and positions of temperature sensors.

FIG. 8 is a diagram showing an example of a flow of a temperature control process of the incubator according to Example 2.

DESCRIPTION OF EMBODIMENTS

In the following, preferred embodiments of an automatic analyzer according to the present invention will be described with reference to the accompanying drawings. Note that in the following description and the accompanying drawings, components having the same functions are designated with the same reference signs, and the redundant description will be omitted.

First Embodiment

Referring to FIG. 1, an example of the overall structure of an automatic analyzer will be described. The automatic analyzer is a device that analyzes specific components contained in a specimen such as blood or urine submitted from a patient, and the automatic analyzer has a rack transport path 13, a tray 6, a reagent disk 3, an incubator 1, an analysis unit 18, a main body cover 7, a control circuit 10, and a computer 11. In the following, the components will be described.

The rack transport path 13 transports a specimen rack 15, on which a plurality of specimen vessels 14 storing a specimen is mounted, to a position to which a specimen probe 2A is accessible. The specimen stored in the specimen vessel 14 is dispensed to a reaction cell 4 held on the incubator 1 with the specimen probe 2A.

On the tray 6, the reaction cell 4 or a dispensing tip 5, which are consumables, is disposed. The dispensing tip 5 is attached to the tip end of the specimen probe 2A, and replaced every time when the specimen probe 2A dispenses the specimen. The reaction cell 4 is transferred from the tray 6 to the incubator 1 by a consumable gripper 12, and used for storing a mixed solution of the specimen and a reagent.

On the reagent disk 3, a plurality of reagent vessels 16 storing reagents is kept. In order to reduce degradation in the reagent, the inside of the reagent disk 3 is kept at a temperature lower than room temperature. Moreover, the reagent disk 3 is covered with a reagent disk cover 17. Note that FIG. 1 shows a part of the reagent disk cover 17 alone in order to show an example of disposing the reagent vessel 16. The reagent stored in the reagent vessel 16 is dispensed to the reaction cell 4 to which the specimen is dispensed with a reagent probe 2B.

The incubator 1 holds a plurality of reaction cells 4 in which a mixed solution of the specimen and the reagent is stored, and keeps the reaction cell within a target temperature range that is a temperature range in which the mixed solution is subjected to reaction. The mixed solution is subjected to reaction within the target temperature range for a predetermined time period in the course of holding the reaction cell 4 on the incubator 1, and the mixed solution becomes a reaction solution to be used for analysis. The shape of the incubator 1 may be a circular shape as shown in FIG. 1, or may be a shape in which the reaction cells 4 are linearly arranged. In the case of a circular shape, the reaction cells 4 are arranged on the edge of the incubator 1 along the outer periphery, and transferred to positions to which the specimen probe 2A, the reagent probe 2B, or the analysis gripper 19 is accessible by rotation of the incubator 1. The configuration relating to the temperature control of the incubator 1 will be described later with reference to FIG. 2.

The analysis unit 18 analyzes specific components contained in the reaction solution stored in the reaction cell 4. The reaction cell 4 storing the reaction solution to be analyzed is transferred from the incubator 1 to the analysis unit 18 with the analysis gripper 19.

The main body cover 7 houses the rack transport path 13, the tray 6, the reagent disk 3, the incubator 1, and the analysis unit 18, and prevents dust and the like from being mixed.

The control circuit 10 is a temperature control circuit that controls the temperature of the incubator 1. The control circuit 10 may be dedicated hardware configured of an ASIC (Application Specific Integrated Circuit), FPGA (Field-Programmable Gate Array), or the like, or may be an MPU (Micro-Processing Unit) that executes software. A process flow of temperature control by the control circuit 10 will be described later with reference to FIG. 4.

The computer 11 controls the operation of the components, receives inputs of data necessary for analysis, and displays or stores results of analysis.

Referring to FIG. 2, an exemplary structure of the incubator 1 will be described. The incubator 1 in FIG. 2 has a circular shape, holds the plurality of reaction cells 4 along the circular outer periphery, and rotates about the center of the circle as a rotation axis at a predetermined angle every lapse of a predetermined time period. The incubator 1 includes a heater 9 and a plurality of temperature sensors 8 used for temperature control.

The heater 9 is a heat source that heats the incubator 1, and is provided along the outer periphery of the incubator 1. That is, the heater 9 is provided along a direction in which the plurality of reaction cells 4 is arranged.

The temperature sensor 8 is a device that measures the temperature at a position provided on the incubator 1 at a predetermined time interval. In order to more accurately measure the temperature of the reaction cell 4 held on the incubator 1, the temperature sensor 8 is desirably provided near the reaction cell 4, and disposed along the outer periphery of the incubator 1, for example. Moreover, in order to grasp the temperatures of the plurality of reaction cells 4, the plurality of temperature sensors 8 is desirably disposed at regular intervals. That is, the plurality of temperature sensors 8 is preferably disposed at positions in rotational symmetry to the incubator 1 having a circular shape. When three temperature sensors 8 are provided, these temperature sensors 8 are disposed at 120-degree intervals as exemplified in FIG. 2. The temperatures measured by the plurality of temperature sensors 8 are sent to the control circuit 10.

The control circuit 10 controls the output of the heater 9 such that the incubator 1 is kept within the target temperature range based on the measured temperatures sent from the plurality of temperature sensors 8. Note that in the present embodiment, the output of the heater 9 is controlled such that the incubator 1 is not excessively heated in highly sensitive response to a local temperature drop due to local temperature fluctuations, e.g., due to dispensing a reagent at a low temperature. That is, by avoiding excess heating of the incubator 1 with a local temperature drop, the reaction of the mixed solution stored in most of the reaction cells 4 is made stable other than the position at which temperature drops, and analysis accuracy is maintained.

Referring to FIG. 3, an example of a process flow in which the incubator 1 is involved will be described in steps.
(S301)
The reaction cell 4 transferred from the tray 6 with the consumable gripper 12 is mounted on the incubator 1.
(S302)
The specimen probe 2A dispenses a specimen from the specimen vessel 14 to the reaction cell 4. Note that the reaction cell 4 reaches a position to which the specimen probe 2A is accessible by rotation of the incubator 1.
(S303)
The reagent probe 2B dispenses a reagent from the reagent vessel 16 to the reaction cell 4 to which the specimen is dispensed, and a mixed solution of the specimen and the reagent is generated. Note that the reaction cell 4 to which the specimen is dispensed reaches the position to which the reagent probe 2B is accessible by further rotation of the incubator 1.
(S304)
The mixed solution stored in the reaction cell 4 is turned into a reaction solution used for analysis by subjecting to reaction within a target temperature range for a predetermined time period during in which the incubator 1 is rotating while holding the reaction cell 4. The reaction cell 4 storing the reaction solution is transferred to the analysis unit 18 with the analysis gripper 19, and the analysis unit 18 analyzes the reaction solution in the transferred reaction cell 4.
(S305)
Concurrently with a process flow from S301 to S304, the control circuit 10 conducts the temperature control of the incubator 1. Referring to FIG. 4, the processes in the present steps, i.e., an example of a process flow of the temperature control of the incubator 1 will be described in steps. Note that FIG. 4 shows the case in which a local temperature drop below the lower limit of the target temperature range occurs in the incubator 1.
(S401)
The plurality of temperature sensors 8 measures temperatures at current time, and sends the measured temperatures to the control circuit 10.
(S402)

The control circuit 10 extracts and stores the highest temperature at the current time from a plurality of measured temperatures sent from the plurality of temperature sensors 8.

(S403)

The control circuit 10 calculates a moving average between the highest temperature extracted in S402 and the highest temperature in the past. Note that this step may be skipped as necessary.

Referring to FIG. 5, the calculation of moving averages between the highest temperature at current time and the highest temperature in the past will be described. The horizontal axis in FIG. 5 is time at which a temperature is measured, arranging the order of t1, t2, . . . , and A, B, and C correspond to three temperature sensors 8, respectively. Moreover, a double circle is designated to the temperature sensor 8 that measures the highest temperature at each time, and the highest temperature at each time is expressed in a format such as C(t1) and B(t2). Note that C(t1) is a temperature measured by the temperature sensor 8 for C at time t1, and B(t2) is a temperature measured by the temperature sensor 8 for B at time t2.

FIG. 5 shows an example in which as a moving average, the mean value between the highest temperature at current time and two highest temperatures in the past is calculated. For example, the moving average at time t3 is calculated as a mean value of C(t1), B(t2), and C(t3), which are highest temperatures at time t1, t2, and t3, respectively, and a moving average at time t4 is calculated from highest temperatures B(t2), C(t3), and B(t4) at time t2, t3, and t4, respectively. Note that since no highest temperature in the past exists at time t1, C(t1) is used as a moving average, and since the highest temperature in the past is only C(t1) at time t2, the mean value between C(t1) and B(t2) is used. Moreover, the number of highest temperatures in the past used for calculating a moving average is not limited to two.

(S404)

The control circuit 10 controls the output of the heater 9 based on the difference between the moving average calculated in S403 and the target temperature. That is, the larger the difference between the moving average and the target temperature becomes, the larger the output of the heater 9 becomes. The moving average is used for temperature control, and thus it is possible to reduce the influence of noise included in the measured temperature.

Note that in the case in which S403 is skipped, the control circuit 10 controls the output of the heater 9 based on the difference between the highest temperature and the target temperature extracted in S402. S403 is skipped, and thus it is possible to shorten processing time for the temperature control.

The temperature of the incubator 1 is controlled according to the process flow described above based on the highest temperature among the temperatures measured by the plurality of temperature sensors 8, and thus it is possible to keep most of the incubator 1 within the target temperature range with no excess response to a local temperature drop. As a result, the reaction of the mixed solution stored in most of the reaction cells 4 held in the incubator 1 is stabilized, and it is possible to maintain analysis accuracy.

Referring to FIGS. 6 and 7, the manner of disposing the plurality of temperature sensors 8 will be described. FIG. 6 is a diagram showing temperature changes over time for the position numbers of the reaction cell 4 held in the incubator 1 having a circular shape, and areas in the outside of the target temperature range are expressed by shaded portions. A cooling factor 1 and a cooling factor 2 are events due to a reagent at a low temperature, dispensing a specimen, and the like, and time at which a reagent at a low temperature or a specimen is dispensed is given to a reaction cell 4 at a certain position number. Although the temperature of the reaction cell 4 at a certain position number drops to the outside of the target temperature range due to the cooling factor 1 or the cooling factor 2, the temperature of the reaction cell 4 returns to within the target temperature range for a predetermined time period due to thermal conduction from surrounding and the like. Although the shape of the shaded portion expressing the outside of the target temperature range is a step shape in detail, the shape is roughly a parallelogram as exemplified in FIG. 6. The width of the parallelogram, which is a length in the time direction, is calculated by a temperature difference between a liquid to be dispensed and the incubator 1, a liquid amount, or the coefficient of thermal conductivity of the incubator 1. Moreover, the slope of the oblique side of the parallelogram is calculated by the rotation speed of the incubator 1.

FIG. 7 shows the case in which three temperature sensors 8 are disposed at positions A, B, and C on the incubator 1 having the areas in the outside of the target temperature range exemplified in FIG. 6. At the sensor positions, a solid line expresses that the temperature is in the inside of the target temperature range, and a dotted line expresses that the temperature is in the outside of the target temperature range. According to the disposition of the temperature sensors 8 exemplified in FIG. 7, at least one of the three temperature sensors 8 is in the inside of the target temperature range at any time, and thus the temperature of the incubator 1 can be controlled based on the highest temperature among the measured temperatures of the three temperature sensors 8. That is, the temperature sensor 8 only has to be disposed such that at least one of the plurality of temperature sensors 8 is located at a certain position in the inside of the target temperature range at given time based on the size of a parallelogram obtained from the temperature or amount of the liquid to be dispensed and the like. Note that the number of the temperature sensors 8 is desirably smaller from the viewpoint of costs.

Note that a configuration may be provided in which the time at which the temperature returns from the outside of the target temperature range to the inside of the range is predicted from the temperature or amount of the liquid to be dispensed and the like, and in the case in which the measured temperature of the temperature sensor 8 is in the outside of the target temperature range even at the predicted time, the computer 11 informs an abnormality. Moreover, the computer 11 may correct the measured temperature in the outside of the target temperature range by the differential value from the target temperature together with informing an abnormality.

In the description above, the case is described in which a substance whose temperature is lower than the temperature of the incubator 1 is introduced into the incubator 1. A substance to be introduced into the incubator 1 may be a substance whose temperature is higher than the temperature of the incubator 1. In the case in which the substance at a high temperature is introduced, a heat source that cools the incubator 1, for example, a Peltier element, is provided in the incubator 1 instead of the heater 9 that heats the incubator 1, and in temperature control in FIG. 4, a highest temperature is replaced with a lowest temperature.

With such replacement, the temperature of the incubator 1 is controlled based on the lowest temperature among the measured temperatures of the plurality of temperature sensors 8, and thus it is possible to keep most of the incubator 1 within the target temperature range with no excess response to a local temperature rise. As a result, the reaction of the mixed solution stored in most of the reaction cells 4 held in the incubator 1 is stabilized, and it is possible to maintain analysis accuracy.

In addition, temperature control may be temperature control that is not based on the highest temperature or the lowest temperature among the measured temperatures of the plurality of temperature sensors 8. For example, the temperature of the incubator 1 may be controlled based on a measured temperature in a certain ordinal rank when the measured temperatures of the plurality of temperature sensors 8 are arranged in ascending order or in descending order. In temperature control based on the highest temperature or the lowest temperature, the output of the heat source is suppressed, and thus a time period is necessary for the temperature of the reaction cell 4 in the outside of the target temperature range to reach the target temperature. Therefore, the temperature is controlled based on a certain ordinal rank, a measured temperature in a second rank, for example, among the plurality of measured temperatures, and thus it is possible to cause the temperature of the reaction cell 4 in the outside of the target temperature range to reach the inside of the target temperature range at higher speed.

Moreover, the temperature sensor 8 is not necessarily fixed to the incubator 1. That is, the temperature of the incubator 1 may be measured in a non-contact manner using an infrared sensor and the like as the temperature sensor 8. Specifically, in the case in which the incubator 1 is in a circular shape and rotates, the temperature sensor 8 is fixed to the main body cover 7, and is relatively displaced to the incubator 1. Furthermore, at least one of the plurality of temperature sensors 8 desirably measures a temperature at a position farthest from a position at which a reagent that is a factor of local temperature fluctuations is dispensed, e.g., a position opposite to the dispensing position through the center of a circle when the incubator 1 is in a circular shape, for example. The temperature at the position farthest from the dispensing position is measured, and thus the influence of local temperature fluctuations is reduced.

Second Embodiment

In the first embodiment, the temperature control of the incubator 1 is described based on the highest temperature or the lowest temperature among the measured temperatures of the plurality of temperature sensors 8. The temperature control of the incubator 1 with no highly sensitive response to local temperature fluctuations is not limited to the first embodiment. In the present embodiment, temperature control based on a most frequent temperature that is a mode among the measured temperatures of a plurality of temperature sensors 8 will be described. Note that the difference from the first embodiment is a process flow of the temperature control of an incubator 1, and the other description is omitted.

Referring to FIG. 8, a process flow of temperature control of the present embodiment will be described in steps.
(S801)
The plurality of temperature sensors 8 measures temperatures, and sends the measured temperatures to a control circuit 10.
(S802)
The control circuit 10 classifies a plurality of measured temperatures sent from the plurality of temperature sensors 8 into a plurality of classes. For example, the measured temperatures are classified into two classes in which the temperature is higher or lower than a preset threshold, or the measured temperatures are classified into three classes, TH1 or less, between TH1 and TH2, and TH2 or more, using two thresholds in a relationship TH1<TH2. The classes each have a representative value for temperature.
(S803)
The control circuit 10 extracts a most frequent temperature that is a mode among the plurality of classes classified in S802. For example, in the case in which two are a class for high temperature and one is a class for low temperature among three temperature sensors 8, the representative value of the class for high temperature is the most frequent temperature. Moreover, in the case in which one is a class for TH1 or less, two are a class between TH1 and TH2, and one is a class for TH2 or more among four temperature sensors 8, the representative value of the class corresponding to the class between TH1 and TH2 is the most frequent temperature. To the two thresholds TH1 and TH2, the lower limit and the upper limit of the target temperature range may be set. Note that the number of classes classified in S802 is desirably smaller than the number of the temperature sensors 8 such that the extraction of the most frequent temperature is made easy.
(S804)
The control circuit 10 controls the output of a heat source such as a heater 9 or a Peltier element based on the difference between the most frequent temperature extracted in S803 and the target temperature. That is, the larger the difference between the most frequent temperature and the target temperature becomes, the larger the output of the heater 9 or the Peltier element becomes.

The temperature of the incubator 1 is controlled based on the most frequent temperature among the temperatures measured with the plurality of temperature sensors 8 according to the process flow described above, and thus it is possible to keep most of the incubator 1 within the target temperature range with no excess response to local temperature fluctuations. As a result, the reaction of the mixed solution stored in most of reaction cells 4 held in the incubator 1 is stabilized, and it is possible to maintain analysis accuracy.

As described above, a plurality of embodiments according to the present invention has been described. The present invention is not limited to the foregoing embodiments, and a component may be modified within a scope not deviating from the gist of the invention. Moreover, a plurality of components disclosed in the foregoing embodiments may be appropriately combined. Furthermore, from all the components described in the foregoing embodiments, some components may be removed.

REFERENCE SIGNS LIST

1: incubator
2A: specimen probe
2B: reagent probe
3: reagent disk
4: reaction cell
5: dispensing tip
6: tray
7: main body cover
8: temperature sensor
9: heater
10: control circuit
11: computer
12: consumable gripper
13: rack transport path
14: specimen vessel 15: specimen rack
16: reagent vessel
17: reagent disk cover
18: analysis unit
19: analysis gripper

The invention claimed is:

1. An automatic analyzer for analyzing a specimen, comprising:

an incubator having a circular shape and configured to hold a plurality of vessels that store a mixed liquid of the specimen and a reagent, and to rotate about an axis among a plurality of positions;

an analyzing unit configured to analyze the mixed liquid;

a heat source for heating or cooling the incubator;

a plurality of temperature sensors for measuring a temperature of the incubator at different positions of the vessels of the incubator; and a control unit configured to control an output of the heat source based on a difference between a target temperature and a highest temperature or a lowest temperature among the measured temperatures measured by the plurality of temperature sensors; and control the output of the heat source during and between rotation of the incubator, wherein when the specimen and/or the reagent whose temperature is lower than a temperature of the incubator is introduced into the incubator, the control unit increases an amount of heating by the heat source based on a difference between the highest temperature and a target temperature of the incubator, whereas when the specimen and/or the reagent whose temperature is higher than a temperature of the incubator is introduced into the incubator, the control unit increases an amount of cooling by the heat source based on a difference between the lowest temperature and the target temperature of the incubator, wherein the control unit is further configured to increase the amount of heating or the amount of cooling of the heat source based on one or more cooling factors each associated with a time period of a variation over time of a temperature of the incubator at one of a plurality of positions of the vessels held by the incubator.

2. The automatic analyzer according to claim 1, wherein the control unit is further configured to calculate, as the highest temperature, a moving average between a first plurality of the measured temperatures at a current time and a second plurality of the measured temperatures in a past time, or to calculate, as the lowest temperature, the moving average between the first plurality of the measured temperatures at the current time and the second plurality of measured temperatures in the past time, and control a heat output of the heat source based on a difference between the moving average and the target temperature.

3. An automatic analyzer for analyzing a specimen, comprising:

an incubator having a circular shape and configured to hold a plurality of vessels that store a mixed liquid of the specimen and a reagent, and to rotate about an axis among a plurality of positions;

an analyzing unit configured to analyze the mixed liquid;

a heat source for heating or cooling the incubator;

a plurality of temperature sensors each disposed at a different position along an outer periphery of the incubator and configured to measure a temperature of the incubator at each said different position of the vessels along the outer periphery of the incubator; and a control unit configured to control an output of the heat source based on a difference between a target temperature and a highest temperature or a lowest temperature among the measured temperatures measured by the plurality of temperature sensors; and control the output of the heat source during and between rotation of the incubator, wherein at least one of the temperature sensors is fixed at a position at which the temperature measured by the at least one temperature sensor remains within a target temperature range, the position at which the at least one temperature sensor is fixed is determined based on one or more cooling factors each associated with a time period of a variation over time of a temperature of the incubator at one of a plurality of positions of the vessels held by the incubator, and the duration of the time period of the variation over time of the temperature of the incubator at the position at which the at least one temperature sensor is fixed is calculated based on a temperature or an amount of a liquid to be dispensed into the incubator, and a rotation speed of the incubator.

4. The automatic analyzer according to claim 3, wherein the incubator holds the vessel at a circular edge, and each of the temperature sensors is fixed at a rotationally symmetric position along the outer periphery of the incubator.

5. An automatic analyzer for analyzing a specimen, comprising:

an incubator having a circular shape and configured to hold a plurality of vessels that store a mixed liquid of the specimen and a reagent, and to rotate about an axis among a plurality of positions;

an analyzing unit configured to analyze the mixed liquid;

a plurality of temperature sensors for measuring a temperature of the incubator at different positions of the vessels of the incubator; and a control unit configured to control an output of the heat source based on a difference between a target temperature and a highest temperature or a lowest temperature among the measured temperatures measured by the plurality of temperature sensors; and control the output of the heat source during and between rotation of the incubator, wherein at least one of the temperature sensors moves relative to the incubator and measures the temperature of the incubator at a vessel position farthest from the vessel position of the incubator at which the specimen or the reagent is dispensed, and the control unit is further configured to increase the amount of heating or the amount of cooling of the heat source based on one or more cooling factors associated with a time period of a variation over time of a temperature of the incubator at the position farthest from the position of the incubator at which the specimen or the reagent is dispensed.

6. An automatic analyzer for analyzing a specimen, comprising:

an incubator having a circular shape and configured to hold a plurality of vessels that store a mixed liquid of the specimen and a reagent, and to rotate about an axis among a plurality of positions;

an analyzing unit configured to analyze the mixed liquid;

a heat source for heating or cooling the incubator;

a plurality of temperature sensors for measuring a temperature of the incubator at different positions of the vessels of the incubator; and a control unit configured to control an output of the heat source based on a difference between a target temperature and the highest temperature or the lowest temperature among the measured temperatures measured by the plurality of temperature sensors; and control the output of the heat source during and between rotation of the incubator, wherein when the specimen and/or the reagent whose temperature is lower than a temperature of the incubator is introduced into the incubator, the control unit increases an amount of heating by the heat source based on a difference between a most frequently occurring temperature over a time period and a target temperature of the incubator, whereas when the specimen and/or the reagent whose temperature is higher than the temperature of the incubator is introduced into the incubator, the control unit increases an amount of cooling by the heat source based on a difference between the most frequently occurring temperature and the target temperature of the incubator, wherein the control unit is further configured to increase the amount of heating or the amount of cooling of the heat source based on one or more cooling factors each associated with a time period of a variation over time of a temperature of the incubator at one of a plurality of positions of the vessels held by the incubator.

7. The automatic analyzer according to claim 6, wherein the control unit is further configured to determine a plurality of classes each associated with a different group of temperatures of a plurality of the temperatures measured by the plurality of temperature sensors over the time period, and the number of temperature sensors is greater than the number of the plurality of classes.

* * * * *